United States Patent [19]

Fraige

[11] Patent Number: 4,481,248

[45] Date of Patent: Nov. 6, 1984

[54] BUOYANT FIBER PRODUCT AND METHOD OF MANUFACTURING SAME

[76] Inventor: Richard Fraige, 11005 Hwy. 50 East, Carson City, Nev. 89701

[21] Appl. No.: 337,122

[22] Filed: Jan. 5, 1982

[51] Int. Cl.$^3$ .......................... B32B 5/16; B05D 1/36
[52] U.S. Cl. .................................... 428/283; 156/279; 264/45.3; 264/46.3; 427/203; 427/209; 427/243; 5/451
[58] Field of Search ................ 428/240, 283, 304.4, 428/310.5, 311.1, 311.5, 313.5, 314.4, 314.8, 316.6, 317.9, 318.4, 323; 5/450, 451; 156/62.2, 279; 264/45.3, 46.3, 46.2; 427/203, 209, 243, 424

[56] References Cited

U.S. PATENT DOCUMENTS

| | | | |
|---|---|---|---|
| 2,147,362 | 2/1939 | Bloomberg | 428/304.4 |
| 2,992,149 | 7/1961 | Drelich | 156/276 |
| 3,025,202 | 3/1962 | Morgan et al. | 264/45.3 |
| 3,037,897 | 6/1962 | Pelley | 264/46.2 |
| 3,050,427 | 8/1962 | Slayter et al. | 264/45.3 |
| 3,304,219 | 2/1967 | Nickerson | 428/327 |
| 3,389,195 | 6/1968 | Gianakos et al. | 428/304.4 |
| 3,598,672 | 8/1971 | Heller | 428/407 |
| 3,900,648 | 8/1975 | Smith | 428/317.9 |
| 3,952,126 | 4/1976 | Dycks | 428/283 |
| 4,021,589 | 5/1977 | Copley | 428/317.9 |
| 4,182,649 | 1/1980 | Isgur et al. | 428/240 |
| 4,301,560 | 11/1981 | Fraige | 5/450 |
| 4,362,778 | 12/1982 | Andersson et al. | 428/304.4 |

*Primary Examiner*—William J. Van Balen

[57] ABSTRACT

A buoyant fiber product and method of manufacturing same. The fiber product includes a quantity of fibers which are bound together with a binder. The binder also secures a quantity of buoyant particles, such as foam beads, to the fibers. The buoyant particles render the product buoyant. The fiber product is manufactured by adding an adhesive and buoyant particles to a quantity of fibrous material. Upon curing of the adhesive, the fibers and particles are bound together.

30 Claims, 3 Drawing Figures

BUOYANT FIBER PRODUCT AND METHOD OF MANUFACTURING SAME

BACKGROUND OF THE INVENTION

1. Field of the Invention

The subject invention relates generally to a fiber product and method of manufacturing same and, more particularly, to a bonded buoyant fiber product and method of manufacturing same.

2. Prior Art

Polyester fiber has many applications including use in waterbed mattresses for the purpose of inhibiting wave motion. As set forth in my U.S. Pat. No. 4,301,560 entitled "Waterbed Mattress" which issued on Nov. 24, 1981 and which is hereby incorporated by reference, bonded non-woven polyester fiber disposed within a waterbed mattress very effectively reduces undesirable wave motion.

The most undesirable wave motion occurs near the upper surface of the mattress. This portion of the wave motion can be inhibited by positioning the fiber in the upper part of the mattress. This can be accomplished by filling substantially all of the mattress with the fiber. The fiber, which is nonbuoyant, rests on the bottom, inner surface of the mattress and extends upwards into the upper portion of the mattress.

Although wave motion can be effectively reduced in the manner described above, the necessity of filling substantially all of the mattress with the fiber is a serious drawback. The large required amount of fiber increases the shipping weight of the mattress and, more importantly, significantly increases the cost of manufacturing the mattress.

One solution to the above problem is to render the bonded fiber buoyant in some manner. The term buoyant as used herein means buoyant in water. One prior art appraoch is to construct a laminated fiber pad comprised of an upper layer of fiber, a middle layer of buoyant foam material and a lower layer of fiber. The buoyant foam material can be either a thin foam pad or a thin layer of foam beads. The laminated pad is held together by suitable adhesives, stiching, riviting and other similar methods.

The prior art buoyant laminated pads are effective in suppressing wave motion. However, such pads are relatively expensive to manufacture because of the large amount of manual labor required in the manufacture.

Another prior art attempt to produce a buoyant fiber product involves the use of polypropolene fiber. This fiber, unlike polyester fiber, is buoyant in water. However, if a commonly used bonding agent, such as acrylic latex, is used the fiber is rendered non-buoyant. Experiments have been conducted with buoyant bonding agents. However, it is not believed that any of such experiments have been met with success.

The present invention overcomes the above-described shortcomings. A novel buoyant fiber product is disclosed which may be used effectively to reduce wave motion in a waterbed mattress. Conventional automated assembly lines for producing nonbuoyant bonded fiber can be readily and easily adapted to manufacture the subject fiber product. Essentially no manual labor is required; therefore, the cost of manufacturing the buoyant fiber does not greatly exceed that of bonded non-buoyant fiber. These and other advantages of the subject invention will become apparent after reading the following detailed description of the invention together with the drawings.

SUMMARY OF THE INVENTION

A buoyant fiber product and method of manufacturing same is disclosed. The fiber product is comprised of a multiplicity of fibers together with a multiplicity of buoyant particles. A binder is disposed over the fibers such that substantially each of the fibers are bound to at least one other fiber. The same binder is disposed over the buoyant particles such that substantially each of the particles is bound to at least one of the fibers. The buoyant particles are present in sufficient quantity to render the fiber product buoyant.

The buoyant fiber product is manufactured by adding an adhesive, such as acrylic latex, to a quantity of fibrous material which may be comprised of polyester fibers. A quantity of particles, such as foam beads, are also added to the fibrous material. The particles are buoyant when added to the fibrous material or upon or after application of heat.

DETAILED DESCRIPTION OF THE INVENTION

Figure 1:
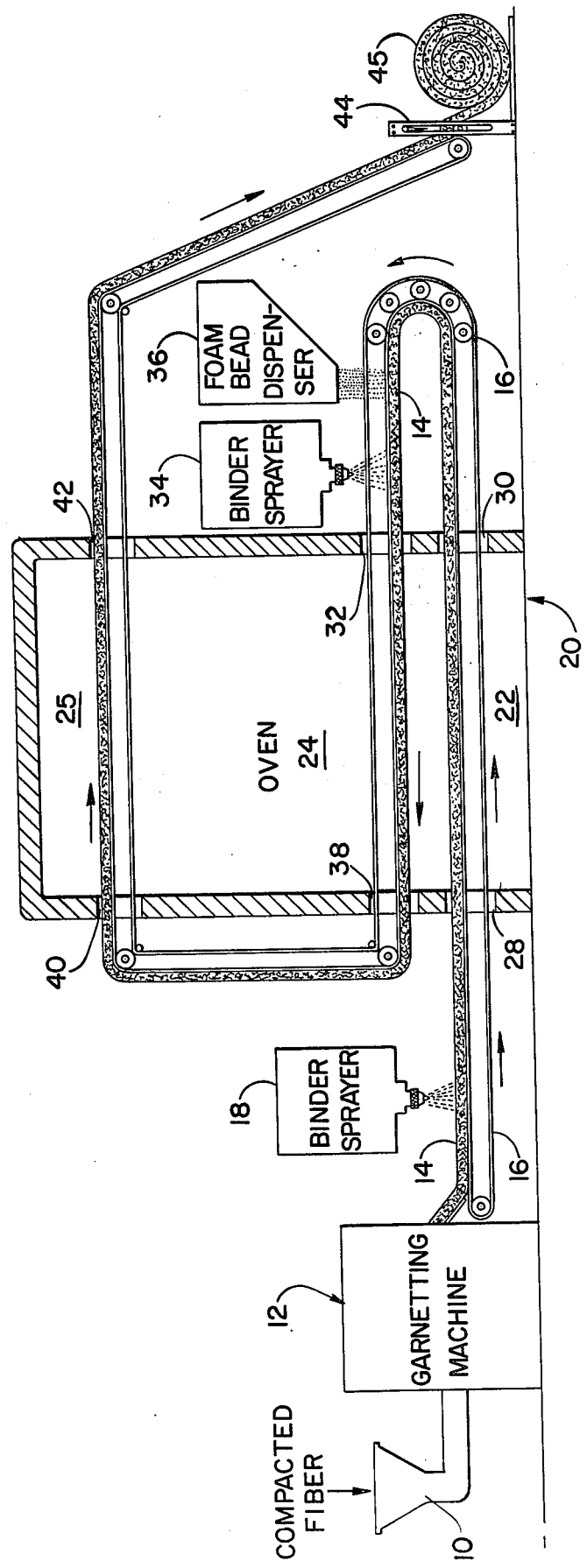
FIG. 1 is a simplified schematic representation of the presently preferred method of manufacturing the subject fiber product

Referring now to the drawings, FIG. 1 is a simplified schematic representation of a preferred method of manufacturing the subject fiber product. The manufacturing process is commenced by introducing an unbonded fiber into the hopper 10 of a conventional garnetting machine, generally designated by the numeral 12. It is preferable that polyester fiber be used although other fibers may be acceptable. For ease of handling, the fiber should be in staple form rather than continuous, with the length of the individual fibers being approximately 2 to 3 inches. A fiber of 40 to 45 denier (weight per given unit length) has been found to be acceptable in waterbed applications. However, a combination of 75% 40 denier and 25% 15 denier produces a superior product for this application.

Conventional garnetting machine (sometimes referred to as a garnett) 12 is provided with a series of grooved rollers which shread, tear and comb the compacted fiber so as to form a continuous stream 14 of lofted fiber of relatively uniform density, thickness and width. Garnetting machine 12 is set to provide a continuous lofted fiber stream approximately on the order of 2 inches in thickness. The weight of the 2 inch thick lofted fiber is preferably on the order of one and one half ounces per square foot (i.e., a lofted fiber having a density on the order of nine ounces per cubic foot). The width of the fiber stream is dependent upon the size of the waterbed mattress in which the final product is to be installed. A typical width is approximately sixty inches.

The fiber stream 14 exits the garnetting machine and is delivered to a conveyer chain 16. Conveyer chain 16 delivers the unbonded fiber to a conventional binder sprayer 18. Sprayer 18 typically reciprocates back and forth across the width of the fiber stream 14 so as to uniformly coat the upper portion of the fiber with the binder which is in liquid form. This uncured or partially cured binder is sometimes referred to herein as an adhesive. The liquid binder will trickle down through the fiber stream 14 and coat a large portion of the individual fibers.

The binder is preferably a self-crossing linking acrylic emulsion such as the binder marketed by Union Carbide of New York, N.Y. under the trademark "UCAR LATEX 879.". The Rohm and Haas Company of Philadelphia, Pa. also markets a suitable binder under the trademark "Rhoplex TR-407." . The binder should be diluted with a water solvent, as recommended by the manufacturer, to permit spraying. Binders utilizing non-aqueous solvents are not preferred.

The fiber carrying the uncured (or partially cured) binder is then transported to a conventional drying and curing oven, generally designated by the numeral 20. The fiber makes three passes through the oven on conveyer chain 16. The heat of the oven causes the water solvent of the binder to evaporate and further causes the binder to cure. The oven is approximately thirty feet in length with the lineal speed of the conveyer chain 16 being approximately thirty feet per minute. Accordingly, the drying and curing time in the oven is roughly one minute per pass or a total of three minutes.

Oven 20 is provided with three thermostats which are used for independently controlling the oven temperature in the three areas 22, 24 and 26 adjacent the conveyer chain 16. Optimum results have been achieved by maintaining the oven temperature in the three areas at approximately 225° F. Typical curing temperatures for conventional bonded non-buoyant fiber is somewhat higher, i.e., on the order of 275° F.

Conveyer chain 16 first enters oven 12 through entrance 28 and exits through exit 30. During this first pass through the oven, the binder applied by sprayer 18 is partially dried and cured. Conveyer 16 loops around and re-enters the oven at entrance 32. A second binder sprayer 34, similar to sprayer 18, sprays additional binder through conveyer chain 16 and onto the opposite side of the fiber stream 14. The second application of binder, which trickles down through the fiber stream, ensures that substantially all of the fibers are at least partially coated with binder.

Prior to the second application of binder, unexpanded foam beads are dispensed over the fiber stream 14 by dispenser 36. Unexpanded polystyrene foam beads which expand up to approximately 1/16 inch in diameter upon application of heat are preferred. It is also preferable that the foam beads contain some form of fire retardent. As the term is used herein, an unexpanded foam bead is a bead which expands to at least triple its unexpanded diameter upon or after application of heat. Unexpanded foam beads manufactured by BASF Wyanndott Corporation of Wyanndott, Michigan under the trademark "STYROPOR" have been found suitable. Another supplier of unexpanded foam beads is ARCO Polymers of Los Angeles, Calif.

Dispenser 36 dispenses the foam beads evenly over the surface of the fiber stream at a predetermined rate. Ordinary garden variety fertilizer spreaders have been found suitable for this purpose. A single spreader is capable of dispensing beads over a twenty inch path. In order to cover the entire sixty inch width of the fiber stream 14, three spreaders are positioned adjacent one another over the conveyer chain 16. The spreaders are each driven by a common gear drive with a gear ratio selected to achieve the desired rate of bead delivery. Additional spreaders can be added to the bead dispenser in order to accommodate fiber streams having widths greater than sixty inches. It is preferable that dispenser 36 include an on/off mechanism. Thus, if conventional non-buoyant bond fiber is desired, the assembly line can be switched over by simply shutting down dispenser 36. A slight increase in oven temperature may be required.

The small diameter unexpanded foam beads have a tendency to drift down into the interior of the fiber stream 14 due to gravity. The uncured binder sprayed by sprayer 34 also tends to drive the beads down into the fiber. Substantially all of the foam beads are at least partially covered with the liquid binder.

The fiber stream 14 reenters the oven at entry 32. The heat of the oven then begins to dry and cure the newly added binder and further dries and cures the original binder. In addition, the heat causes the foam beads to expand. The stream 14 then exits the oven through opening 38 and returns to the oven through opening 40. The final binder curing takes place during this third and final pass through the oven. In addition, the foam beads become fully expanded during this final pass if they have not already done so.

The fiber stream 14 exits oven 20 through opening 42 and is carried to ground level by the conveyer chain 16. A cutting device 44 cuts the fiber stream into convenient lengths which are wound into rolls 45 for shipping.

The cured binder causes substantially all of the fibers to be bonded to at least one other fiber. The same binder causes substantially all of the foam beads to be bonded to at least one of the fibers. Thus, an integral buoyant fiber product is produced.

It is important to note that the oven curing temperature and time are critical. If the oven temperature is too low or the oven time is too short, the binder will not become fully cured. On the other hand, if the oven temperature is too high or the time is too long, the polystyrene beads will fully expand and then contract to an unsuitably small diameter. It should also be noted that the time and temperature values previously set forth may have to be adjusted to ensure complete curing while maintaining acceptably large bead diameters.

It is preferable to dispense the beads over the fiber stream immediately prior to the final binder spraying. As previously stated, the force of the sprayed binder encourages the unexpanded beads towards the center of the fiber stream. Also, the sprayed binder coats the beads and secures the beads to the fiber upon curing. In any event, the beads should be introduced at some point prior to the curing of the binder so that the liquid binder will cause substantially all of the beads to adhere to at least one of the fibers.

Figure 2:
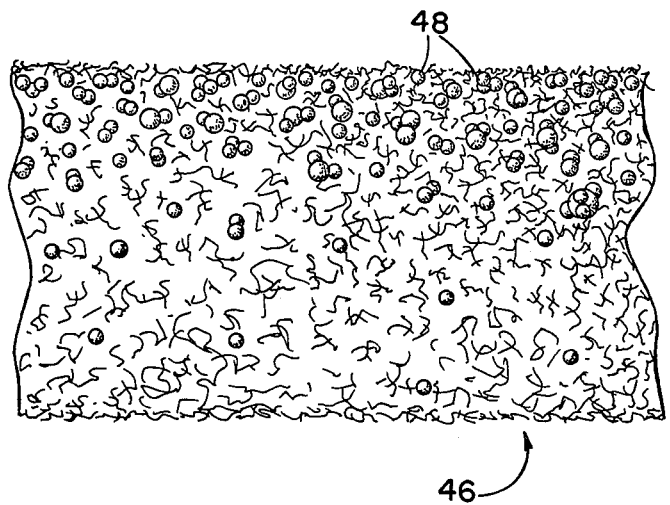
FIG. 2 shows a representative cross-section of a sample of the subject fiber product.

FIG. 2 shows a cross-section of a sample of the final mesh-like buoyant fiber product, generally indicated by the numeral 46. Each of the fiber strands is bonded to at least one other fiber by the binder at one or more points to form an integral unit. The expanded foam beads 48 are dispersed throughout the product with the greater concentration being near the top surface, which was the surface closest to bead dispenser 36. The beads are secured in place by the same binder which binds the individual fibers together. The bead dispenser 36 (FIG. 1) is preferably driven at a rate such that there are an average of approximately fifteen to fifty expanded beads per cubic inch of fiber (unexpanded or partially expanded beads are not counted). An expanded bead is a bead which has a diameter which is at least three times as great as the original unexpanded diameter. The number of foam beads required to render the final product buoyant may have to be adjusted to compensate for variations in bead diameter and in the weight of the fiber and binder.

Figure 3:
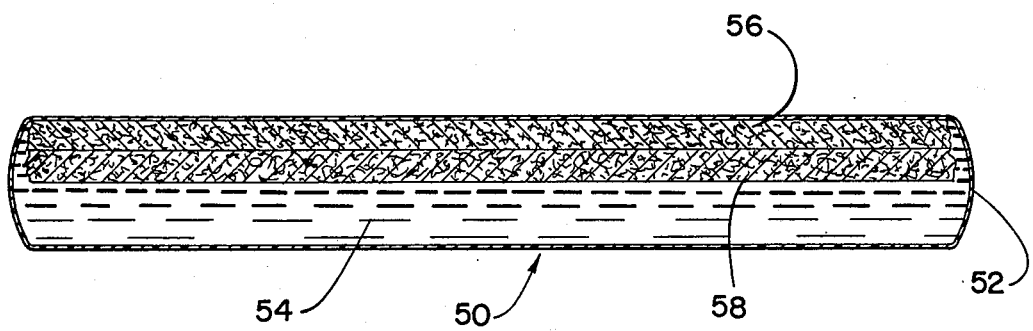
FIG. 3 is an elevated cross-sectional side view of a waterbed mattress with the subject fiber product installed for the purpose of suppressing wave motion.

Referring now to FIG. 3, a cross-section of a waterbed mattress, generally designated by the numeral 50, may be seen. The mattress is comprised of a suitably shaped flexible outer envelope 52, made of polyvinyl or the like, which is typically 9 inches deep, 72 inches wide, and 84 inches in length. The envelope 52 is substantially filled with water 54.

Disposed within envelope 52 are two pads 56 and 58 which are comprised of the subject buoyant fiber product. Each pad is 2 inches thick, 72 inches wide and 84 inches in length. Pads 56 and 58 are preferably laminated together using a suitable adhesive or by stitching or the like. The pads are each aligned with the surface having the greater bead concentration at the top.

The buoyant pads 56 and 58 float within the envelope 52 adjacent the upper surface thereof. Thus, the meshlike structure formed by the polyester fibers will greatly dampen wave motion in the area adjacent the occupant without the necessity of filling substantially the entire envelope 52 with costly fiber. There will also be a tendency to inhibit the formation of wave action. It is perferred that the two pads be only slightly buoyant, especially the lower pad 58. If pad 58 is highly buoyant, it will have a tendency to compress the upper pad 56 thereby reducing the loft of the pad and reducing the wave motion suppressing qualities.

It is important to note that, unlike prior art buoyant pads utilizing a sheet of foam material, the spaced-apart foam beads of the subject buoyant fiber product permit convection currents to pass through the pad. Accordingly, the pads will be thermally transparent so that the area adjacent the occupant will be uniformly and efficiently heated if a heating unit is being used.

Thus, a novel buoyant fiber product has been disclosed. This product can be easily manufactured using existing bonded fiber processing equipment with very minor modifications. The modified processing equipment can be readily converted between non-buoyant fiber and buoyant fiber by simply activating and deactivating the foam bead dispenser 36 (FIG. 1).

Although a perferred embodiment of the subject fiber product and method of manufacturing same has been disclosed, it will be apparent to those familiar with the art that modifications can be made without departing from the scope of the invention as defined by the appended claims. For example, fibers other than polyester may be found to be satisfactory provided the required wave motion suppression properties are present. It is perferable that the fibers be either non-woven or loosely woven and have a high loft. In addition, buoyant particles other than foam beads may be used, provided that such particles are compatible with the binder and retain significant buoyancy following the curing process, which may or may not take place at an elevated temperature. For waterbed applications, all components used should be resistant to degradation in water and resistent to chemicals commonly added to waterbed mattresses.

What is claimed is:

1. A method of manufacturing a buoyant, readily water-permeable and therefore heat-convection-transparent, but wave-retarding fiber product for use in waterbeds to deter wave action; said method comprising the following steps:
    providing a quantity of lofted fibrous material comprising a large multiplicity of fibers, in the form of a matting that is readily water-permeable throughout;
    while maintaining the lofted, readily water-permeable condition of the material, adding to said fibrous material a large multiplicity of particles, said particles being permanently buoyant at least upon or after application of heat and being spaced apart singly or in clusters to maintain the said readily water-permeable condition;
    while maintaining the lofted, readily water-permeable condition of the material, adding a binder;
    said particle-adding and binder-adding steps being performed in such a way that the binder contacts at least part of substantially each of said fibers and at least part of substantially each of said particles, and with substantially each of said particles being positioned adjacent at least one of said fibers, respectively, whereby the binder will set the material in said lofted, readily water-permeable condition; and
    then leaving the material in said lofted, readily water-permeable condition for use in such waterbeds to float within and near the top thereof and to retard waves therein, the material being thereby effectively transparent to heat transfer through the water in such a waterbed by means of water convection currents.
2. A fiber product manufactured in accordance with the method of claim 1.
3. The method of claim 1 wherein said buoyant particles are foam beads.
4. The method of claim 3 wherein said foam beads are unexpanded foam beads.
5. The method of claim 3 wherein said foam beads are unexpanded foam beads and wherein said method further comprises the additional step of curing said binder following said addition of said binder and expanding said unexpanded foam beads by the application of heat.
6. A fiber product manufactured in accordance with the method of claim 5.
7. The method of claim 5 wherein curing temperature and curing time are controlled such that, subsequent to said curing step, said binder is substantially cured and said unexpanded foam beads are substantially expanded.
8. The method of claim 7 wherein said lofted fibrous material is comprised of polyester fibers and has a density on the order of nine ounces per cubic foot.
9. The method of claim 7 wherein said binder is comprised of latex.
10. The method of claim 7 wherein said quantity of lofted fibrous material is comprised of polyester fibers and has a density on the order of nine ounces per cubic foot, said binder is comprised of latex and said unexpanded foam beads are comprised of polystyrene.
11. A fiber product manufactured in accordance with the method of claim 10.
12. A method of manufacturing a buoyant, readily water-permeable and therefore heat-convection-transparent, but wave-retarding fiber product for use in waterbeds to deter wave action; said method comprising the following steps:
    providing a quantity of fibrous material comprising a large multiplicity of fibers in a form that is readily water-permeable throughout;

providing a large multiplicity of unexpanded foam beads;

providing a quantity of binder of the type which is polymerized by the application of heat;

while maintaining the readily water-permeable condition of the material, combining said fibrous material, said foam beads and said binder so that substantially each of said foam beads is positioned adjacent at least one of said fibers, respectively, and with the foam beads being spaced apart singly or in clusters in such a way as to maintain the water-permeability of the material; and curing said binder and expanding said foam beads by the application of heat, whereby the binder will set the material in said readily water-permeable condition with the foam beads spaced apart from each other singly or in clusters but with each foam bead linked by the binder to at least one of the fibers; and then leaving the material in said readily water-permeable condition for use in such waterbeds to float within and near the top thereof and to retard waves therein, the material being thereby effectively transparent to heat transfer through the water in such a waterbed by means of water convection currents.

13. The method of claim 12 wherein said fibrous material, said foam beads and said binder are combined in a manner such that, upon curing, substantially all of said fibers are bound to at least one other fiber and substantially all of said beads are bound to at least one of said fibers.

14. The method of claim 13 wherein said fibrous material is lofted.

15. The method of claim 1 wherein:
the quantity of lofted fibrous material is in the form of garnetted fiber.

16. The method of claim 1 wherein:
the providing step comprises garnetting a fibrous material.

17. The method of claim 1 wherein:
the providing step comprises shredding, tearing and combing a fibrous material.

18. The method of claim 12 wherein:
the first mentioned providing step comprises garnetting a compacted fibrous material.

19. The method of claim 12 wherein:
the first-mentioned providing step comprises shredding, tearing and combing a fibrous material.

20. The method of claim 1 wherein:
the adding step is effected by means of at least one binder sprayer, and at least one foam bead dispenser, respectively discharging binder and discharging foam beads onto the fibers as the latter are carried on a continuous web.

21. The method of claim 12 wherein:
the combining step is effected by automatically spraying binder, and automatically dispensing foam beads, onto the fibers as a continuous web carries the fibers past spraying and bead-dispensing positions, respectively.

22. The method of claim 1, wherein:
the fibrous-material providing step provides the material in the form of a laterally extended matting that has a laterally extended upper surface; and said method also comprises, after the particle-adding step and before the said leaving step and while maintaining the lofted, readily water-permeable condition of the material, forcing the particles into and away from the upper surface of the matting to form a nonhomogeneous distribution of the particles within the matting.

23. The method of claim 1, further comprising:
after the particle-adding step but before the leaving step, applying heat to render the particles permanently buoyant;

whereby the said heat-applying step sets the material in said condition with the particles still nonhomogeneously distributed within and away from the upper surface of the matting; and whereby the said step of leaving the material in said condition has the effect of leaving the particles so distributed.

24. The method of claim 22, wherein:
the particle-forcing step is effected by causing a fluid to flow from above the upper surface of the matting downwardly toward and through the matting.

25. The method of claim 24, wherein:
the fluid is caused to flow forcibly from above the upper surface of the matting.

26. The method of claim 22, wherein:
the particle-forcing step and the binder-adding step are combined, the combined step comprising spraying the binder upon the upper surface of the matting to drive the particles downwardly into the matting while coating the particles and while coating the fibers of the matting.

27. The method of claim 12, wherein:
the fibrous-material-providing step provides the material in the form of a laterally extended matting that has a laterally extended upper surface; and said method also comprises, after the combining step and before the said curing step and while maintaining the readily water-permeable condition of the material, forcing the foam beads into and away from the upper surface of the matting to form a nonhomogeneous distribution of the particles within the matting;

the said heat-applying step thereby setting the material in said condition with the foam beads still nonhomogeneously distributed within and away from the upper surface of the matting; and the said step of leaving the material in said condition thereby having the effect of leaving the foam beads so distributed.

28. The method of claim 27, wherein:
the foam-bead-forcing step is effected by causing a fluid to flow from above the upper surface of the matting downwardly toward and through the matting.

29. The method of claim 28, wherein:
the fluid is caused to flow forcibly from above the upper surface of the matting.

30. The method of claim 22, wherein:
the foam-bead-forcing step and the binder-adding step are combined, the combined step comprising spraying the binder upon the upper surface of the matting to drive the foam beads downwardly into the matting while coating the foam beads and while coating the fibers of the matting.

* * * * *